United States Patent [19]

Tarascon

[11] Patent Number: 4,751,159

[45] Date of Patent: Jun. 14, 1988

[54] SECONDARY LITHIUM BATTERY INCLUDING A SILVER MOLYBDENUM CATHODE

[75] Inventor: Jean-Marie Tarascon, Millington, N.J.

[73] Assignee: Bell Communications Research, Inc., Livingston, N.J.

[21] Appl. No.: 79,357

[22] Filed: Jul. 30, 1987

[51] Int. Cl.$^4$ .................... H01M 4/34; H01M 4/88
[52] U.S. Cl. .................... 429/194; 429/219; 252/182.1
[58] Field of Search .................... 429/194, 219; 252/182.1

[56] References Cited

U.S. PATENT DOCUMENTS

| | | | |
|---|---|---|---|
| 3,736,184 | 5/1973 | Dey et al. | 429/219 X |
| 4,368,167 | 1/1983 | Berchielli | 429/219 X |
| 4,423,124 | 12/1983 | Dey | 429/219 X |

OTHER PUBLICATIONS

Uchida et al., Chem. Abs. 103: 112140.

*Primary Examiner*—Brian E. Hearn
*Assistant Examiner*—Stephen J. Kalafut
*Attorney, Agent, or Firm*—James W. Falk; Edward M. Fink

[57] ABSTRACT

A secondary lithium battery including a silver molybdenum sulfide cathode evidences a theoretical energy density of 280 watt-hours per kilogram of cathode material, a value several times greater than that of the commercially available nickel-cadmium batteries. During operation of the cell, the silver ions in the cathode are reduced to metallic silver with lithium replacing vacant sites in the cathode. Complete replacement of silver with lithium occurs after 4 discharge cycles, so resulting in a reversible cell comprising a lithium anode and a $Mo_6S_8$ cathode.

5 Claims, 4 Drawing Sheets

SECONDARY LITHIUM BATTERY INCLUDING A SILVER MOLYBDENUM CATHODE

This invention relates to secondary lithium batteries. More particularly, the present invention relates to secondary lithium batteries which utilize a silver molybdenum sulfide ($AgMo_6S_8$) solid state electrode material as the cathode.

During the past decade, the demand for high energy storage devices has generated considerable interest in the study of secondary rechargeable batteries and has led to the discovery of promising battery systems including ambient temperature lithium cells. Unfortunately, the practical utilization of such systems has never been realized, such being attributed to limitations imposed by electrode characteristics, namely the absence of suitable cathode materials as well as the likelihood of dendritic regrowth of lithium on anode surfaces which results in short circuiting of the cell after several cycles.

More recently, workers in the art have obviated the cathode limitation or the discovery of a new class of solid state electrode materials, namely, the transition metal dichalcogenides such as $TiS_2$ and $VS_2$. These materials evidence an open layered structure and more conveniently accommodate lithium reversibly, that is, the lithium may enter the structure and be readily removed therefrom. This mechanism which is referred to as an intercalation reaction is not limited to the layered structure referred to but also is applicable to three dimensional structures having large open channels as found in $V_6O_{13}$ and in the Chevrel phases. Despite the availability of these materials, commercial application has not been attained because of the limited cycling life of the Chevrel phases.

Studies have revealed that the Chevrel phases evidence a stoichiometry of the general formulae $AMo_6S_8$ wherein A represents an atom possessing a valence of +1 or +2 selected from among cadmium, mercury, indium and monovalent metals such as silver and copper. Unfortunately, the Chevrel phases have not found utilization because of the difficulty of removing the metal atoms (A) to facilitate formation of open channels in the Chevrel phase which would permit the reversible intercalation of lithium, a prerequisite for formation of a reversible cathode.

In accordance with the present invention, the foregoing limitations are effectively obviated by the use of a $AgMo_6S_8$ cathode in a cell comprising Li metal as the anode. During the operation of the cell, the silver ions in the $AgMo_6S_8$ are reduced to metallic silver with lithium replacing the now vacant sites in the cathode. Complete replacement of silver at the cathode with lithium is found to occur after four discharge cycles so resulting in a reversible cell comprising lithium as the anode and $Mo_6S_8$ as the cathode, the $Mo_6S_8$ possessing channels which are free of silver and available for the lithium intercalation therein on further discharge and charging. It has been found that up to four lithium atoms per $Mo_6S_8$ molecule will be intercalated. This cell, having silver metal particles imbedded in $Mo_6S_8$ is a secondary cell which evidences a theoretical energy density of 280 watt-hours per kilogram of cathode material, a value which is three times greater than that of commercially available nickel-cadmium batteries. Batteries made from both bulk and thin films of $AgMo_6S_8$ have been found to behave identically.

The invention will be more fully understood by reference to the following detailed description taken in conjunction with the accompanying drawing wherein.

Figure 2:
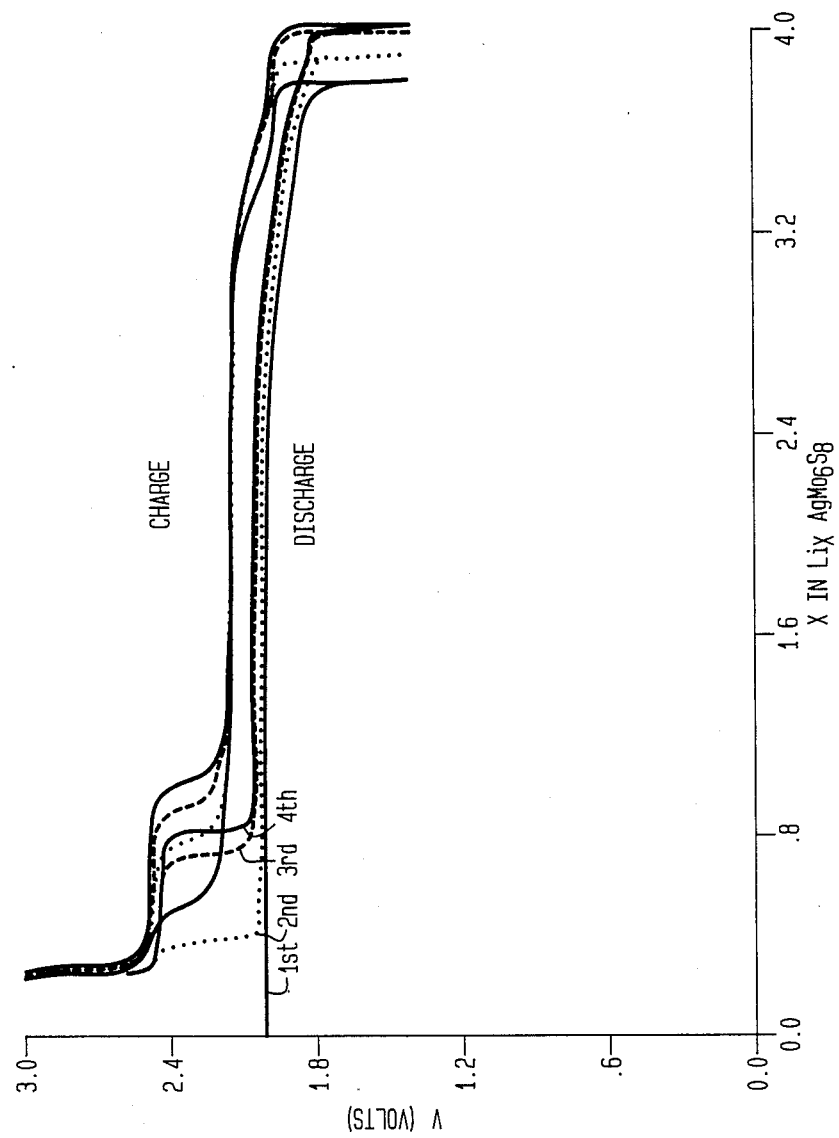
FIG. 2 is a graphical representation on coordinates of lithium atoms x in $Li_xAgMo_6S_8$ against voltage in volts showing the cycling characteristics of lithiated $AgMo_6S_8$ during cycling between 3 and 1.4 volts at a current density of 300 $\mu A/cm^2$.
Figure 3:
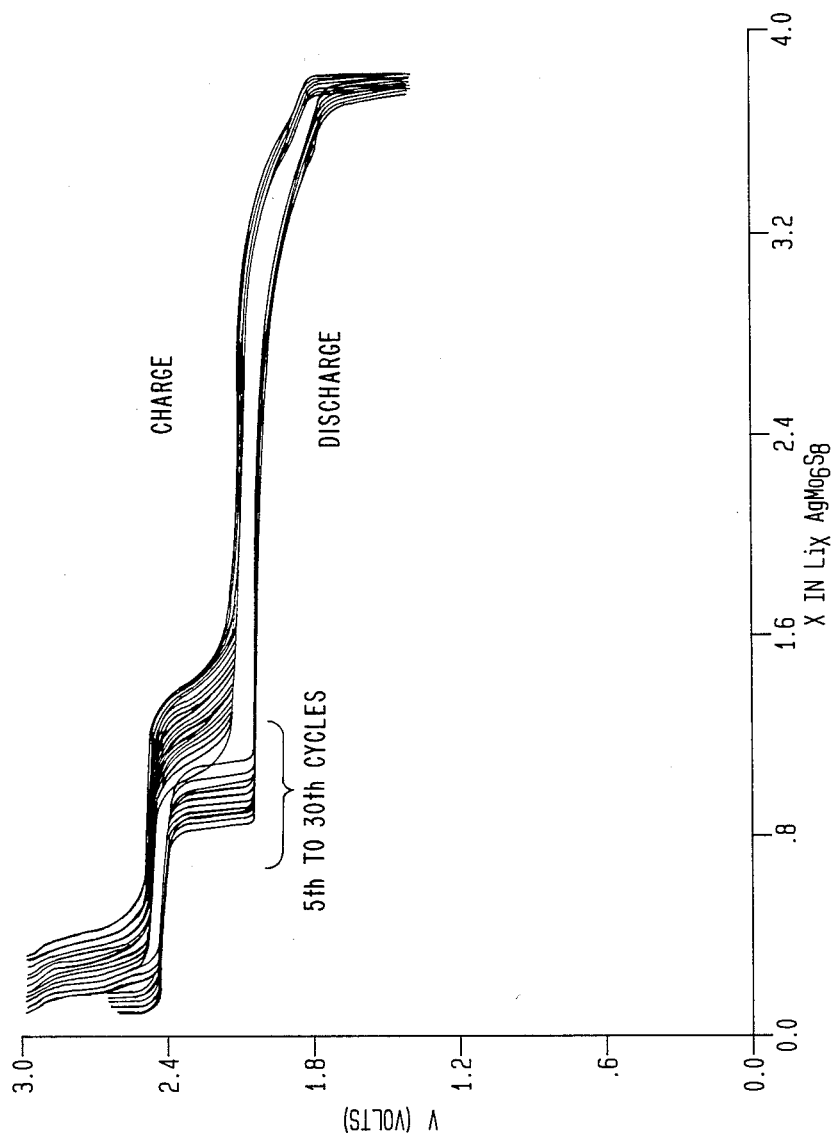
Figure 4:
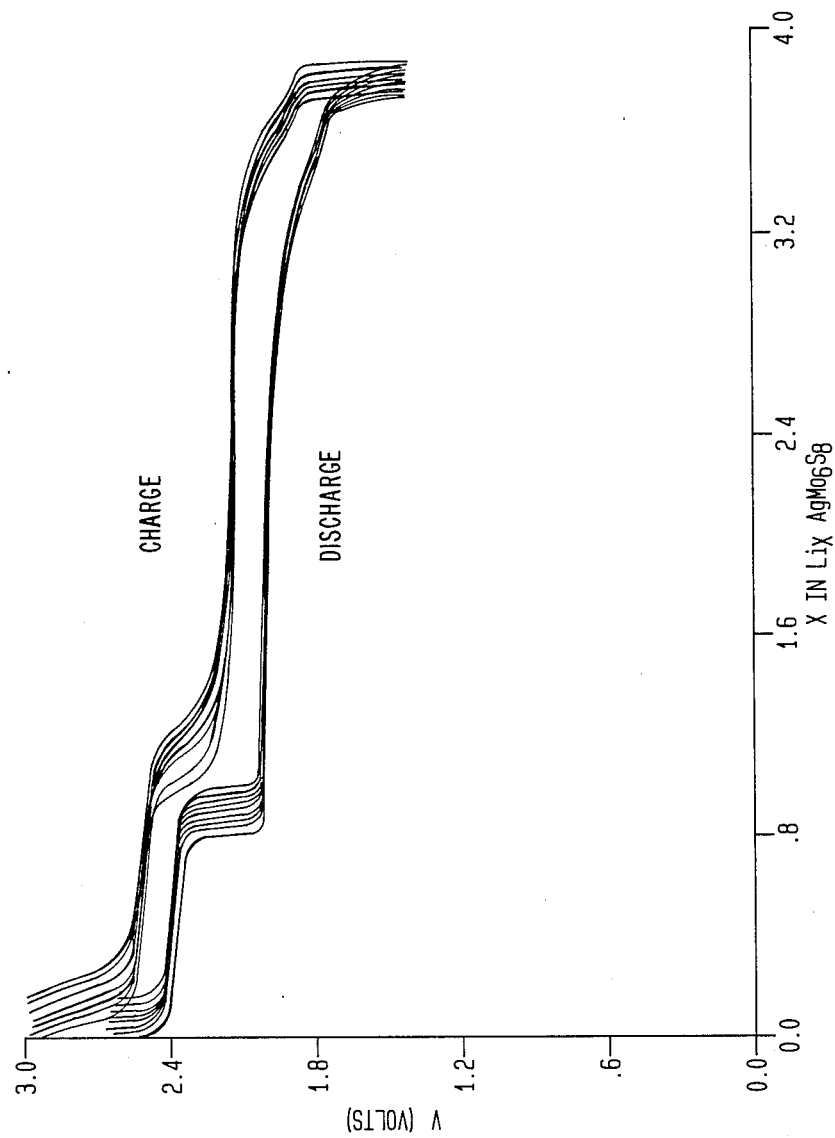

FIG. 3 is a graphical representation on coordinates of lithium atoms x in $Li_xAgMo_6S_8$ against voltage in volts showing the cycling characteristics of the cell of FIG. 2 during long term cycling (30 cycles) between 3 and 1.4 volts at a current density of 300 $\mu A/Cm^2$; and FIG. 4 is a graphical representation on coordinates of lithium atoms x in $Li_xAgMo_6S_8$ against voltage in volts showing the cycling characteristics of a thin film Li/$AgMo_6S_8$ cell containing a 1 micron $AgMo_6S_8$ thin film deposited on a sapphire substrate at a current density of 30 $\mu A/cm^2$ between 3 and 1.4 volts.

Figure 1:
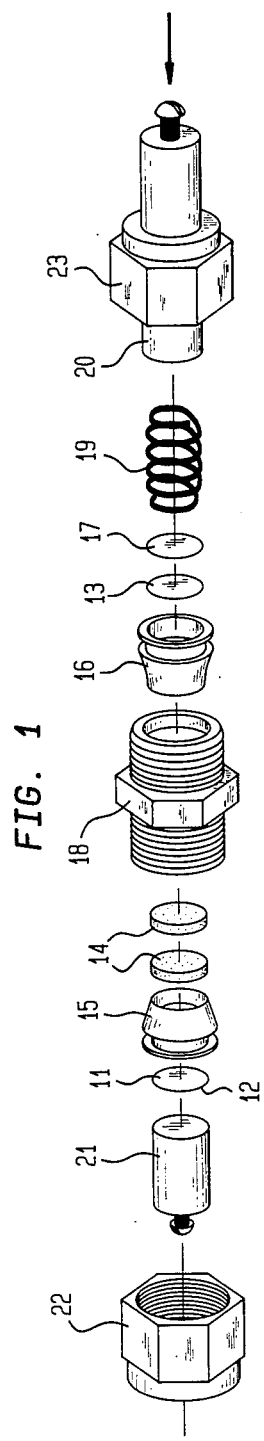
FIG. 1 is an exploded view of a secondary lithium test cell in accordance with the invention.

With reference now more particularly to FIG. 1, there is shown an exploded view of a typical secondary lithium battery of the invention. Shown is cathode 11, in powder form, disposed upon stainless steel disc 12, anode 13 and filter paper 14 which has been soaked in a suitable electrolyte such as $LiClO_4$ in propylene carbonate. The structure also includes polypropylene fitting 15 and 16, steel disc 17, fitting 18, spring 19, plunger 20, stainless steel rod 21 and cap screws 22 and 23. The fittings, when compressed, provide an air tight ambient for the battery. In order to prevent electrochemical contact between plunger 20 and the various fittings in the battery, it is advantageous to coat the plunger with a suitable protective film.

In the fabrication of a lithium battery in accordance with the invention, the initial step involves the preparation of $AgMo_6S_8$, a known composition obtained by conventional commercial methods. Thus, for example, $AgMo_6S_8$ may be synthesized by reacting a mixture of silver, molybdenum and sulfur powders in an evacuated container at temperatures ranging up to 1180° C. for 24 hours and maintaining this temperature for 72 hours prior to cooling. Following, the treated mixture is ground and pressed into a pellet which is refired at a temperature of the order of 1200° C. for 36 hours. The resultant $AgMo_6S_8$ is then ready for use in a secondary lithium cell of the type shown in FIG. 1 wherein lithium is used as the anode. Specifically, electrochemical swagelock test cells are prepared in a helium atmosphere using a lithium metal disk anode separated from a $AgMo_6S_8$ cathode by suitable porous glass paper soaked in an electrolyte such as 1 molar $LiClO_4$ in propylene carbonate. The cell so obtained was then evaluated to determine behavior during discharge to various voltages as a function of the change in lithium atom content per formula unit of $AgMo_6S_8$.

Thin film $AgMo_6S_8$ cathodes can be made in a multistep process. This technique involves sputtering alternate layers of molybdenum and silver with atomic stoichiometry of 6 to 1 upon a suitable substrate such as sapphire or a molybdenum sheet. The films so obtained are then sealed in an evacuated quartz ampoule with molybdenum sulfide powder ($MoS_2$) as a source of sulfur and reacted at 1050° C. for 24 hours. The use of this technique results in the formulation of polycrystalline $AgMo_6S_8$ films having a thickness ranging from 0.5 to 1 micron.

With reference now to FIG. 2 there is shown a graphical representation on coordinates of lithium atoms in $Li_xAgMo_6S_8$ against voltage in volts of the first four discharge-charge cycles for a (Li)/$AgMo_6S_8$ cell prepared as described. The Figure reveals that when discharge is initiated at approximately 2.0 volts the lithium begins to replace the silver in the $AgMo_6S_8$. As discharge continues down to 1.3 volts the amount of lithium intercalated increases to about 3.8 atoms per formula unit of $AgMo_6S_8$ after the first discharge. The cell upon recharging is reversible with regard to lithium but not silver and with a voltage of 3 volts the lithium content becomes 0.3 atoms per formula unit of $AgMo_6S_8$. In subsequent cycling similar behavior and by the end of the fourth cycle all of the silver is removed and the cathode is pure $Mo_6S_8$ containing free silver.

With reference now to FIG. 3, the charge/discharge curves for the cell of FIG. 2 is shown during the 5th through the 30th cycle. The figure reveals that the cell continues to be reversible with low discharge/charge hysteresis, an open circuit voltage of 3 volts and a large steady discharge voltage of about 2 volts. This data was obtained at a discharge current density of 300 $\mu A/cm^2$.

As indicated previously, an advantage of the use of the silver ternary Chevrel phase as the cathode is that $AgMo_6S_8$ can be processed in thin film form. The electrochemical behavior of a thin film $LiAgMo_6S_8$ cell containing a 1 micron $AgMo_6S_8$ thin film deposited upon a sapphire substrate as the cathode is shown in FIG. 4. The figure is a graphical representation on coordinates of lithium atoms, x, in $Li_xAgMo_6S_8$ against voltage in volts showing the cycling characteristics of the cell obtained after the fourth cycle by cycling at a current rate of 30 $\mu A/cm^2$ between 3 and 1.4 volts the $AgMo_6S_8$ having been electrically converted to $Mo_6S_8$. It should be noted that the voltage composition curves for this cell are identical to those of the cell of FIG. 2. However, this cell exhibits a greater overvoltage even though cycled at a lower current rate due to the difference in cell design.

What is claimed is:

1. A non-aqueous battery including a lithium anode, an electrolyte and a cathode, characterized in that said cathode comprises silver molybdenum sulfide of the formula $AgMo_6S_8$.

2. Battery in accordance with claim 1 wherein said cathode is a thin film of $AgMo_6S_8$.

3. Battery in accordance with claim 1 wherein said electrolyte is a solution of lithium perchlorate in propylene carbonate.

4. A non-aqueous secondary lithium battery including a cathode, an electrolyte and an anode, the cathode comprising $Li_xAgMo_6S_8$ wherein x is an integer ranging from 0 to 4.

5. Battery in accordance with claim 1 wherein said cathode comprises a thin film of silver molybdenum sulfide.

* * * * *